United States Patent [19]
Price

[11] Patent Number: 4,740,775
[45] Date of Patent: * Apr. 26, 1988

[54] AUTOMOBILE BURGLAR ALARM

[76] Inventor: Reese Price, 319 E. 79th St., Chicago, Ill. 60619

[ * ] Notice: The portion of the term of this patent subsequent to Feb. 26, 1998 has been disclaimed.

[21] Appl. No.: 115,798

[22] Filed: Jan. 28, 1980

[51] Int. Cl.$^4$ ............................................. B60R 25/04
[52] U.S. Cl. ......................................... 340/65; 340/53; 340/539; 180/287
[58] Field of Search ....................... 340/53, 63, 64, 65, 340/539, 694; 180/279, 287

[56] References Cited
U.S. PATENT DOCUMENTS 3,646,515 2/1972 Vodehnal ............................... 340/64

Primary Examiner—Alvin H. Waring

[57] ABSTRACT

An automobile burglar alarm and theft prevention device for use in an automotive vehicle is adapted to prevent operation of the vehicle when the device is placed in an operative mode. The device comprises an alarm circuit which includes the battery of the vehicle, the alarm and vibration detectors which are adapted to close said alarm circuit upon sensing vibrations caused by automobile tampering. The device also includes an automobile operating circuit comprising the battery, the electrically powered automotive starting elements, a switch for selectively connecting either the alarm circuit or the automobile operating circuit to the battery, and a relay for (1) switching the switch to connect the alarm circuit to the battery while disconnecting the automobile operating circuit and the battery, and (2) switching the switch to connect the automobile operating circuit to the battery while disconnecting the alarm circuit and the battery, thereby disabling the electrically powered automotive starting elements at all times that the alarm circuit is connected to the battery and preventing activation of the car. In alternate embodiments, the automotive accessories are (1) operative, and (2) inoperative, regardless of whether the alarm circuit or the automobile operating circuit is connected to the battery.

8 Claims, 2 Drawing Sheets

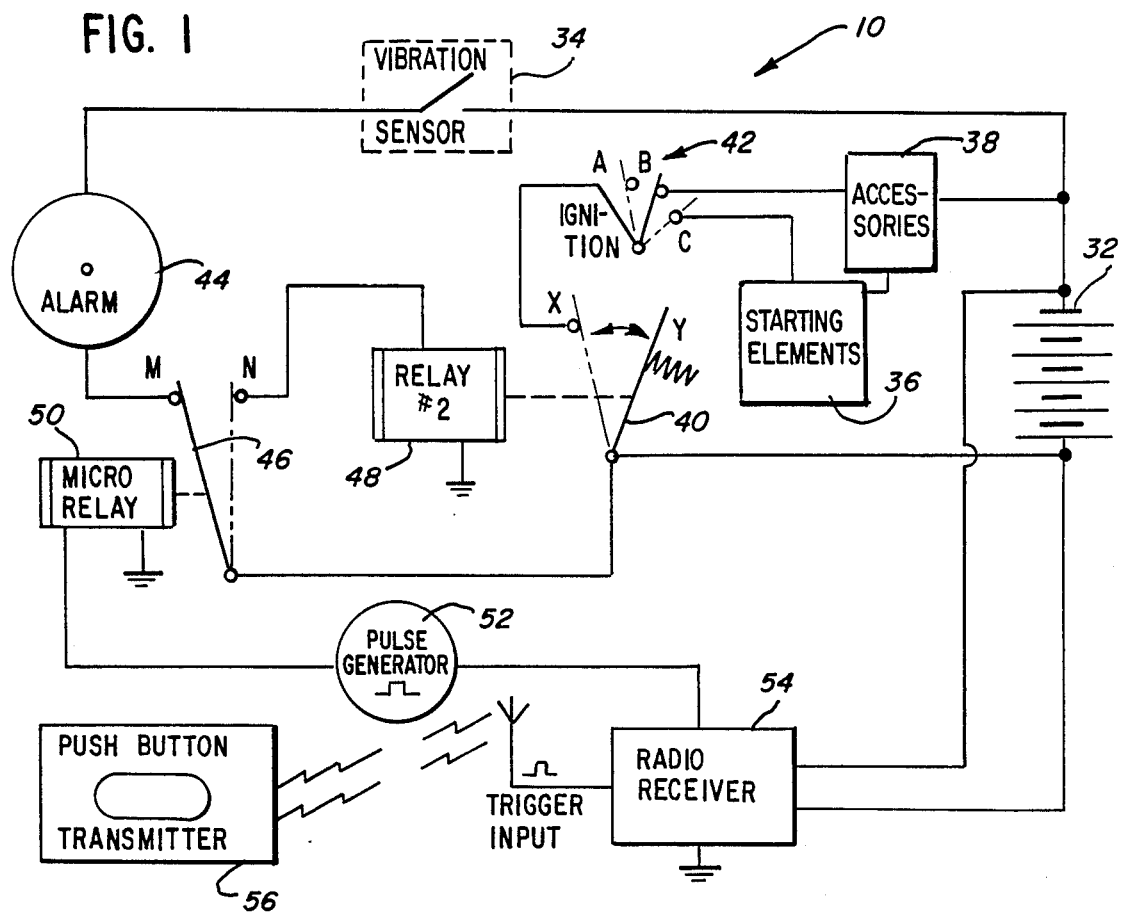
FIG. 1
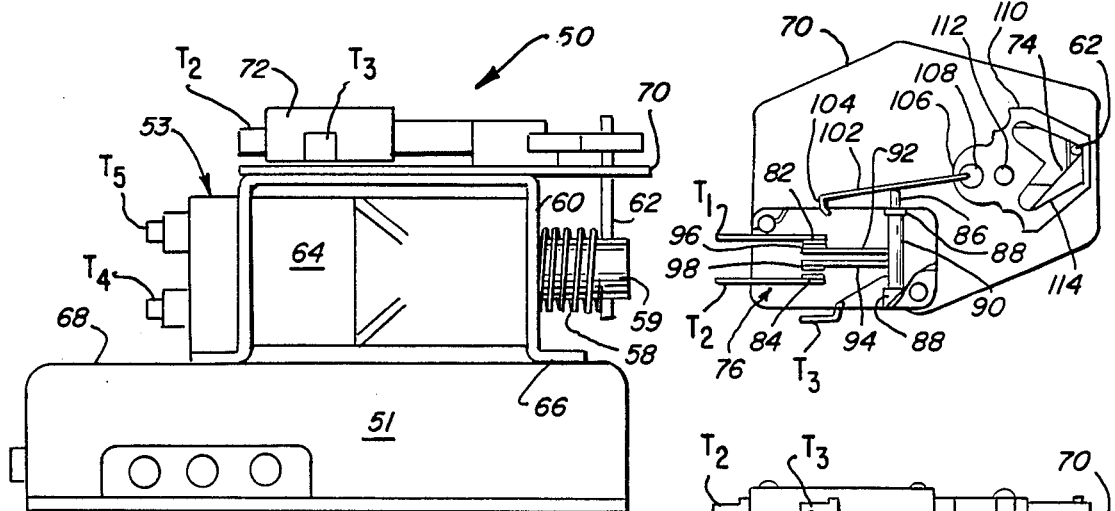
FIG. 2
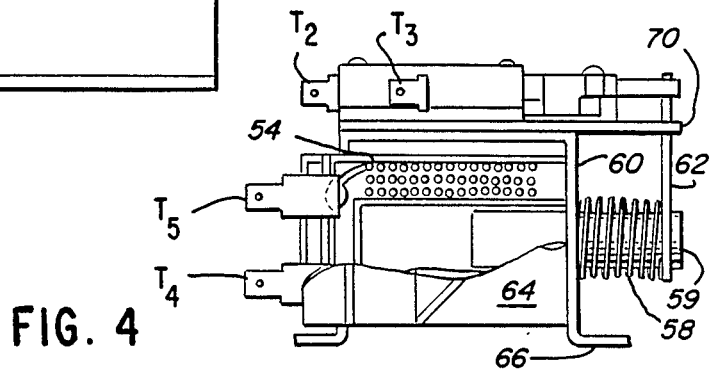
FIG. 3
FIG. 4

AUTOMOBILE BURGLAR ALARM

FIELD OF THE INVENTION

This invention relates generally to the field of automotive burglar alarms and more particularly to an automobile burglar alarm and theft prevention device which, when activated, disables the engine of the automobile.

BACKGROUND OF THE INVENTION

Since automobiles are often parked in secluded, unattended areas for lengthy periods of time, they have become prime targets for thiefs and vandals. Some thiefs are so skilled that they are able to steal a locked, parked car in a matter of seconds. A percentage of the car-driving public, in an effort to deter, if not halt such burglary, have installed alarm systems in their automobiles. Such alarm systems as heretofore known are adapted to sense vibrations of the automobile which occur when the doors, trunk or hood of the vehicle are opened.

Burglars, in response to known alarm systems, have developed techniques for cutting alarm wires without triggering the alarm circuitry. After so disabling the alarm, the burglar "hot wires" or otherwise starts the automobile and drives away to sell the vehicle en masse or to sell it for parts. So, while alarm systems heretofore developed might hinder amateur vandals, the professional burglar is not deterred.

It is one object of the present invention to provide an automobile burglar alarm and theft prevention device which prevents operation of the automobile starting elements when the alarm is in its operative condition so that the automobile cannot be started, even after disabling the alarm.

It is a further object of the present invention to provide an automobile burglar alarm and theft prevention device which is activated by a high-frequency transmitter.

It is still another object of the present invention to provide an automobile burglar alarm and theft prevention device which prevents operation of the automotive accessories as well as the automotive starting elements when the alarm is in its operative condition.

These and other objects and advantages of the present invention will become apparent from the review of the drawings and the detailed description of the invention which follows.

SUMMARY OF THE INVENTION

There is disclosed herein an automobile burglar alarm and theft prevention device for use in an automotive vehicle. The automotive vehicle is conventional in operation and includes a twelve volt D.C. battery, electrically powered automotive starting elements, electrically powered automotive accessories, and a selectively positionable ignition switch. The ignition switch is adapted to draw power from the battery to start the automobile and operate the automotive accessories when in a first position and the ignition switch is adapted to draw power from the battery to operate the automotive accessories without starting the automobile when in a second position.

The automobile burglar alarm and theft prevention device includes an alarm circuit, an automobile operating circuit, and a switch for selectively connecting either the alarm circuit or the automobile operating circuit to the battery of the automobile. The alarm circuit includes the battery, an alarm signal, and vibration detectors for sensing automobile tampering and operative upon sensing vibrations to close the alarm circuit when the alarm circuit is connected to the battery. The automobile operating circuit includes the battery and the electrically powered automotive starting elements.

The burglar alarm and theft prevention device also comprises an element for (a) switching the switch to connect the alarm circuit to the battery while disconnecting the automobile operating circuit and the battery, and (b) for switching the switch to connect the automobile operating circuit to the battery while disconnecting the alarm circuit and the battery, thereby disabling the electrically powered automotive starting elements at all times that the alarm circuit is connected to the battery.

In one embodiment the switch includes an alarm switch which connects and disconnects the alarm circuit to the battery and a start switch which connects and disconnects the automobile operating circuit to the battery. In a second embodiment the switch includes an alarm-start switch for either connecting the alarm circuit to the battery while disconnecting the automobile operating circuit and the battery, or connecting the automobile operating circuit to the battery while disconnecting the alarm circuit and the battery.

BRIEF DESCRIPTION OF THE DRAWINGS

FIG. 1 is a schematic drawing representing the electrical circuitry connecting one preferred embodiment of the burglar alarm and theft prevention device of the present invention to the electrical system of an automotive vehicle;

FIG. 2 is a side elevational view of an electromechanical switch which is adapted to be used with the burglar alarm and theft prevention device of the present invention;

FIG. 3 is a top plan view of the electro-mechanical switch of FIG. 2 with the upper casing removed;

FIG. 4 is a side elevational view of the electromechanical switch, similar to FIG. 2, only having the lower casing 51 cut-away to show the elements housed therein;

DETAILED DESCRIPTION OF THE DRAWINGS

Figure 5:
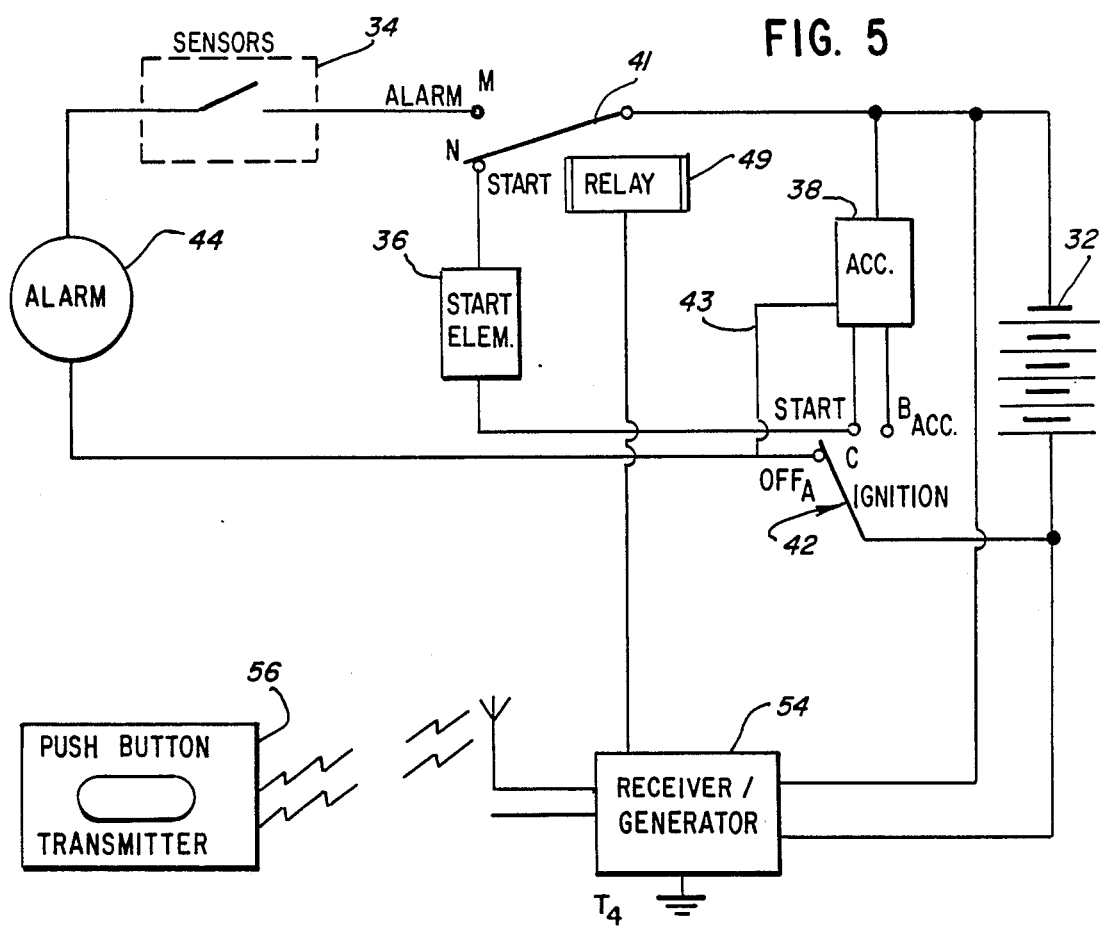
FIG. 5 is a diagrammatical view illustrative of an automotive vehicle and showing the positioning of the vibration detectors thereon.

Referring now to the drawings and particularly to FIG. 1, one preferred embodiment of the automobile burglar alarm and theft prevention device of the present invention is illustrated generally by the reference numeral 10. The automobile burglar alarm and theft prevention device 10 is adapted for use with a conventional, electrically started automotive vehicle, such as 12, shown diagrammatically in FIG. 6.

Conventional automotive vehicles such as 12 include a plurality of internal compartments susceptible to forceable entry techniques by experienced burglars and car thieves, as well as by novice vandals and joy-riders.

These compartments comprise an engine cavity 14 in which the engine, the drive train and the electrical system of the vehicle are housed; a trunk cavity 16 in which the spare tire, luggage and other valuables may be housed; and the passenger cavity 18 in which the vehicle controls are positioned and personal belongings are often left unattended. In order to gain access to these compartments, hood locks, trunk locks and door locks must be opened.

Figure 6:
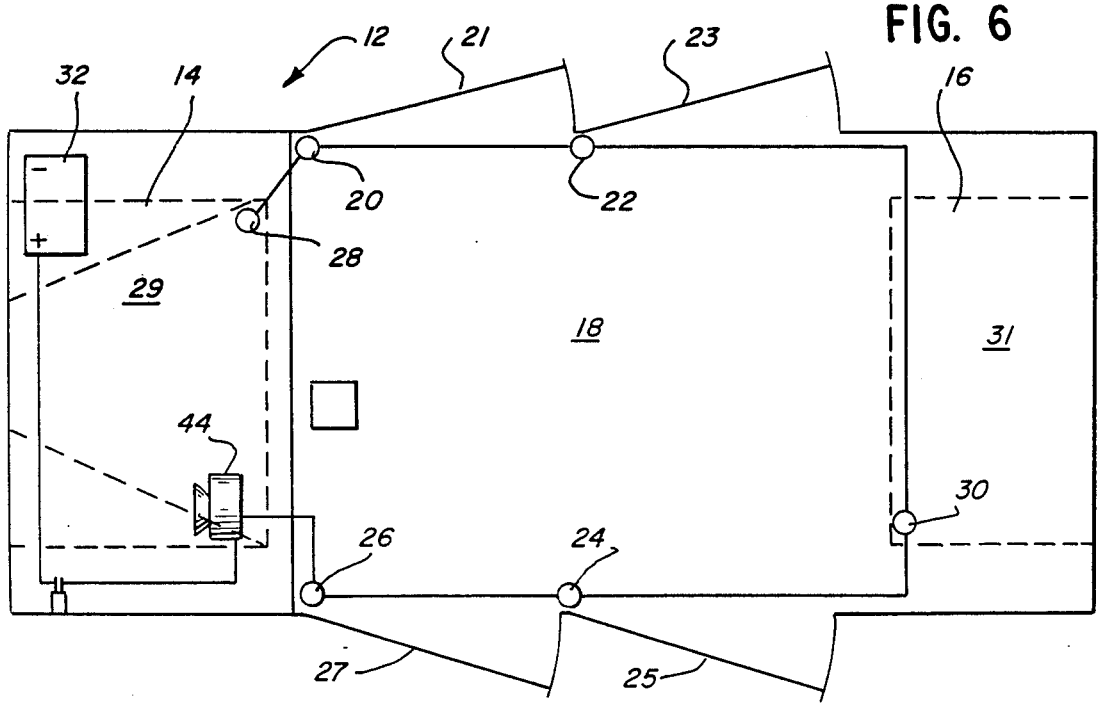
FIG. 6 is a schematic drawing representing the electrical circuitry connecting a second preferred embodiment of the burglar alarm and theft prevention device of the present invention to the electrical system of an automotive vehicle.

Still referring to FIG. 6, vibration detecting devices 20, 22, 24, and 26 are attached to the doors 21, 23, 25, and 27 of the automobive vehicle 12. Similar vibration detecting devices 28 and 30 are attached, respectively, to the hood 29 and trunk 31 of the automotive vehicle 12. These devices are adapted to be sensitive to and detect vibrations incident to opening the doors, hood or trunk of the vehicle 12. The vibration sensing devices 20, 22, 24, 26, 28, and 30 are shown schematically as 34 in FIGS. 1 and 5, but are actually connected in parallel so that the activation of any one of the individual devices 20, 22, 24, 26, 28, or 30 will operate to close an alarm circuit and produce an alarm signal when that alarm circuit is operatively connected to the battery of the vehicle 12.

Within the engine compartment 14 of the conventional automotive vehicle 12, a 12-volt DC battery 32 provides the electrical power for (1) starting the engine by energizing the automobile starting elements, shown generally as 36, and (2) operating various automobile accessories, shown generally as 38. The accessories 38 normally include a radio, heater, windshield wipers, etc. The starting elements 36 normally include such devices as a coil, a bendix, and a starter. The battery 32 is part of an automobile operating circuit which circuit, in the preferred embodiment of FIG. 1, also includes the automobile starting elements 36 and a switch means. The battery 32 may be selectively connected or disconnected to the automotive starting elements 36 by, respectively, closing or opening the switch means and then turning on or off an ignition switch 42. The switch means includes alarm switch relay means 50, an alarm switch 46, start switch relay means 48 and a start switch 40. The start switch 40 is movable between a first position, shown in phantom lines in FIG. 1 (position X), in which said automobile operating circuit is operable, i.e., is able to draw power from the battery, and a second position, shown in solid lines in FIG. 1 (position Y), in which said automobile operating circuit is inoperable, i.e, cannot draw power from the battery 32. When the starting switch 40 is in operable position X, movement of the ignition switch 42 to position C will activate the electrically powered starting elements 36.

It should be clear that with the start switch 40 in its operable, closed circuit position (position X) and the ignition switch turned to its "on" position (position C), the automobile operating circuit is closed and power from the battery 32 is delivered to the automotive starting elements 36 and the automotive accessories 38. It should be further noted that the automotive ignition switch 42 commonly includes a position (position B) for energizing the accessories thereof without starting the automotive vehicle 12. In this position, as in the "on" position, the automobile operating circuit is closed, but now power is supplied only to the accessories 38 and not to the automobile starting elements 36. The ignition switch 42 also has an off position (position A) in which the starting elements and the accessories are inoperative, i.e., can receive no power from the battery 32. As the aforementioned tri-position(off-accessory-on) ignition switch 42 is conventional and forms no part of the instant invention, further description thereof is believed to be unnecessary.

The automotive vehicle 12 is also provided with an alarm circuit which includes the battery 32, an audible and/or visual alarm means 44, a selectively operable alarm switch 46 for selectively connecting or disconnecting the alarm means 44 to the battery 32, and the vibration detection means 34. The vibration means 34 senses automobile tampering and is operative, upon sensing vibrations, to close the alarm circuit when the alarm switch 46 connects the battery 32 to the alarm means 44.

The alarm switch 46 is positionable in two positions, M and N. By selectively positioning the alarm switch 46 into an alarm connect (position M) or an alarm disconnect (position N) position, either the automobile operating circuit or the alarm circuit is rendered operative, i.e., connected to the battery 32. More specifically, with the alarm switch means 46 connecting the alarm means 44 and the battery 32 (position M), a vibration sensed by any of the vibration detection means 34 will close the alarm circuit, thereby activating the alarm means 44. Likewise, with the alarm switch means 46 in position N, a start switch relay 48 is activated to move start switch 40 from its normally open, spring biased position Y into its closed position, position X. When the alarm switch means 46 is in position N and the start switch 40 is in position X, the ignition switch receives power from the battery 32 to energize the automotive starting elements 36 or the automobile accessories (depending upon the ignition switch position).

It should be noted that the accessories 38 are operable only at such time as the alarm switch 46 is in position N, thereby closing the automobile operating circuit. The accessories cannot be operated when the alarm circuit is operable. (position M).

The alarm switch means 46 is moved between its two positions by an alarm switch relay 50 which reacts to signals generated by a pulse generator 52 which may be part of a radio receiving unit 54. The radio receiving unit 54 responds to high frequency waves from a push button transmitter 56. The receiver 54 and transmitter 56 are similar to the receiver and transmitter commonly employed with automatic garage door openers and further explanation thereof is believed unnecessary.

It is to be understood that Applicant is not limiting his invention for use with a high frequency transmitter and relay switches, but any conventional switches and switch activating means may be employed without departing from the spirit and the scope of the invention.

An alternative preferred embodiment of the automobile burglar alarm is illustrated in FIG. 5 wherein like numbers have been used to refer to elements substantially identical with those of FIG. 1. In FIG. 5, the alarm switch 46 and the start switch 40 have been replaced by a single alarm-start switch 41, and the alarm switch relay 50 and the start switch relay 48 have been replaced by a single alarm-start switch relay 49. In this simplified embodiment, as in the FIG. 1 embodiment, it is of primary importance that the automobile operating circuit be disabled, i.e., not connected to the battery 32, when the alarm circuit is connected to the battery 32, and that the alarm circuit be disabled, i.e., not connected to the battery 32, when the automobile operating circuit is connected to the battery 32.

The connection of the battery 32 to either the alarm circuit or the automobile operating circuit is accomplished by moving the alarm-start switch 41 either to position M or to position N. In order to render the alarm circuit operative, it is also necessary to place the ignition switch 42 in its off position, position A, wherein power is delivered via the ignition switch 42 to the alarm means 44. With the alarm-start switch 41 in position M and the ignition switch 42 in position A, vibrations detected by the vibration detecting means 34 will close the alarm circuit and activate the alarm means 44. In order to render the automobile operating circuit operative, it is also necessary to place the ignition switch 42 in its "start" position, position C, wherein power is delivered via the ignition switch 42 to the starting elements 36.

It should be apparent from a review of FIG. 5, that, in this embodiment, the accessories 38 are adapted to always be operable, i.e., to always draw power from the battery so as to be energizable whether (1) the alarm-start switch 41 is in position M or N, or (2) the ignition switch 42 is in position A, B, or C. More specifically, when the ignition switch 42 is in position B, and the alarm-start switch 41 is in position N, power is provided directly to the accessories 38. When the ignition switch 42 is in position C and the alarm-start switch is in position N, since the accessories 38 are disposed in parallel relation to the starting elements 36, power is provided directly to the accessories 38 as well as to the starting elements 36. And when the ignition switch 42 is in position A and the alarm-start switch 41 is in position M, power is provided to the accessories 38 from the battery 32 via the ignition switch 42 and the line 43.

If the alarm-start switch 41 is in position M and the ignition switch 42 is moved into position C in an effort to start the vehicle 12, the automobile operating circuit is open and the vehicle 12 cannot be started. Likewise, if the alarm start switch 41 is in position N and if any of the vibration sensing detectors 34 are closed, the alarm means 44 will not be activated because the alarm circuit is open.

FIGS. 2-4 illustrate one type of electro-mechanical "micro-switch" which can be used as (1) a combination alarm switch 46, alarm relay 50, pulse generator 52 and receiver 54 in the FIG. 1 embodiment of the burglar alarm; or (2) a combination alarm-start switch 41, alarm-start switch relay 49 and receiver/generator 54 in the FIG. 5 embodiment of the burglar alarm.

The micro-switch 50 includes a lower casing 51 in which the radio receiver elements are housed. These elements, being well known and conventional, and not being claimed as part of the instant invention need not be further described.

Attached to the lower casing 51 is an upper switching unit 53 which includes a set of windings 54 having terminals $T_4$ and $T_5$, surrounding a lontitudinally reciprocable plunger 59. A coil spring 58 is compressed between a wall 60 of said unit 53 and an upwardly extending finger 62 so as to normally bias said plunger 59 outwardly of the interior of a housing 64 of the unit 53. A flanged frame 66 which surrounds the unit 53 secures said unit 53 to the upper surface 68 of the lower casing 51.

A flat plate 70, having a slot 74 through which the upper end of the finger 62 extends, forms a base for an upper casing 72. Interiorly of the upper casing 72 is housed a latching relay 76 which comprises (1) a pair of terminals $T_1$ and $T_2$ contact surfaces 82 and 84, respectively, formed at the distal ends thereof; (2) a reciprocating switch having a spring biased pin 86 formed from a non-conductive material attached to sleeve member 90 formed from a conductive material, the sleeve member 90 is reciprocable within bearings 88, and further includes a pair of elongated conductive elements 92 and 94 having contact surfaces 96 and 98, respectively, formed at the distal ends thereof; and (3) a terminal $T_3$ which is always adapted for connection to the battery 32.

A thin elongated rod 102 is secured at one of its distal ends 104 to the housing 64. The other distal end 106 of the rod 102 is pivotably secured within an opening 108 in a cam plate 110. The cam plate 110 is pivotably connected at 112 to the plate 70 and further includes a generally V-shaped opening 114 which receives the upper end of finger 62. Due to the action of a coil spring in sleeve 90, the end of pin 86 is biased against the rod 102 approximate the mid-point of its length.

In operation, the terminal $T_1$ is connected to position M (shown in FIGS. 1 and 5) such that, when closed, it will connect the alarm means 44 to the battery 32; the terminal $T_2$ is connected to position N (shown in FIGS. 1 and 5) such that, when closed, it will connect the starting elements 36 to the battery 32; the terminal $T_4$ is connected to ground or to the negative terminal of the battery 32; the terminal $T_5$ is connected to the input of the windings 54 so that the receiver/generator is always operative to receive a signal from a transmitter such as 56; and the terminal $T_3$ is always connected to the battery 32 and to the bearing sleeve 86 so that either the terminal $T_1$ or the terminal $T_2$ will always be "hot" and power either the alarm circuit or the automobile operating circuit.

When the receiver 54 receives a signal from transmitter 56, the windings 54 operate as an inductor coil and reciprocate the plunger 59. The finger 62 moves within the V-shaped opening 114 in the cam plate 110 to move said cam plate 110 about pivot 112. The rod 102, being pivotably secured to cam plate 110 at 108, moves as said cam plate 110 moves and pushes against the spring bias of pin 86 so as to bring contact surfaces 84 and 98 into electrical contact, thereby connecting the battery 32 and the alarm means 44 while opening the automobile operating circuit (since the contact surfaces 82 and 96 are simultaneously moved out of electrical engagement). When the receiver 54 receives a second signal from the transmitter 56, the process is reversed and the rod 102 pivots away from the upper housing 64 so that the pin 86 is biased outwardly to abut the surface of rod 102. As the pin 86 moves outwardly, contact surfaces 84 and 98 move out of electrical engagement while contact surfaces 82 and 96 move into electrical engagement. In this manner, the signal from the transmitter 56 operates to move alarm-start switch 41 into a closed alarm circuit position (position M) or a closed automobile starting circuit position (position N).

While one form of the invention has been described, it will be understood that the invention may be utilized in other forms and environments, so that the purpose of the appended claims is to cover all such forms of devices not disclosed but which embody the invention disclosed herein.

What is claimed is:

1. An automobile burglar alarm and theft prevention device for use in an automotive vehicle, the vehicle including a battery, electrically powered automotive starting elements and electrically powered atuomotive accessories, a selectively positionable ignition switch, the ignition switch adapted to draw power from the battery to start the automobile and operate the automotive accessories when in a first position and the ignition switch adapted to draw power from the battery to operate the automotive accessories without starting the automobile when in a second position; the automobile burglar alarm and theft prevention device comprising, in combination:

an alarm circuit;

an automobile operating circuit;

switch means for selectively connecting either the alarm circuit or the automobile operating circuit to the to the battery of the automobile; the alarm circuit including the battery, alarm means, and vibration detection means for sensing automobile tampering and operative upon sensing vibrations to close the alarm circuit when the alarm circuit is connected to the battery;

the automobile operating circuit including the battery and the electrically powered automotive starting elements;

means (a) for switching the switch means to connect the alarm circuit to the battery while disconnecting the automobile operating circuit and the battery and (b) for switching the switch means to connect the automobile operating circuit to the battery while disconnecting the alarm circuit and the battery, thereby disabling the electrically powered automotive starting elements at all times that the alarm circuit is connected to the battery.

2. A device as in claim 1 wherein the switch means comprises an alarm switch for connecting and disconnecting the alarm circuit to the battery, and a start switch for connecting and disconnecting the automobile operating circuit to the battery, whereby activating and positioning the ignition switch in the first position connects the automobile operating circuit to the battery.

3. A device as in claim 2 wherein the switch means further includes relay means for switching the start switch to connect and disconnect the automobile operating circuit to the battery.

4. A device as in claim 1 wherein the switch means comprises an alarm-start switch for either connecting the alarm circuit or the automobile operating circuit to the battery.

5. A device as in claim 4 wherein the switch means further includes an alarm-start switch relay for switching the alarm-start switch to connect and disconnect the alarm circuit and the automobile operating circuit.

6. A device as in claim 1 wherein the automobile operating circuit further includes electrically powered automotive accessories, the accessories being disabled at all times that the alarm circuit is connected to the battery.

7. A device as in claim 1 wherein the automobile operating circuit further includes electrically powered automotive accessories, the accessories being operable whenever either the alarm circuit or the automobile operating circuit is connected to the battery.

8. A device as in claim 1, further including high frequency transmitting means for remotely activating the means for switching the switch means.

* * * * *

REEXAMINATION CERTIFICATE (1961st)
United States Patent [19]
Price

[11] B1 4,740,775
[45] Certificate Issued * Mar. 30, 1993

[54] AUTOMOBILE BURGLAR ALARM

[76] Inventor: Reese Price, 319 E. 79th St., Chicago, Ill. 60619

Reexamination Request:
No. 90/002,671, Mar. 20, 1992

Reexamination Certificate for:
Patent No.: 4,740,775
Issued: Apr. 26, 1988
Appl. No.: 115,798
Filed: Jan. 28, 1980

[*] Notice: The portion of the term of this patent subsequent to Feb. 26, 1998 has been disclaimed.

[51] Int. Cl.[5] .............................................. B60R 25/10
[52] U.S. Cl. .................................. 340/429; 340/426; 340/825.69; 340/539; 307/10.3; 180/287
[58] Field of Search ...................... 340/429, 425.5, 426, 340/539, 825.69, 825.72; 307/9.1–10.3, 10.6; 180/167, 287

[56] References Cited
U.S. PATENT DOCUMENTS

| | | |
|---|---|---|
| 2,111,643 | 3/1938 | Salvatori . |
| 2,178,159 | 10/1939 | Battestin . |
| 2,524,579 | 10/1950 | Taylor . |
| 2,591,192 | 4/1952 | Parr . |
| 2,661,622 | 12/1953 | Severs . |
| 2,793,260 | 5/1957 | Ciosek . |
| 2,959,052 | 11/1960 | Alexander . |
| 3,090,226 | 5/1963 | Corti . |
| 3,091,972 | 6/1963 | Johnston . |
| 3,158,831 | 11/1964 | Boyer . |
| 3,197,756 | 7/1965 | Maynard . |
| 3,360,704 | 12/1967 | Kohlhagen . |
| 3,394,275 | 7/1968 | Lippman . |
| 3,538,725 | 11/1970 | Guenther . |
| 3,548,373 | 12/1970 | Rivera et al. . |
| 3,703,714 | 11/1972 | Andrews . |
| 3,816,755 | 6/1974 | McMaster . |
| 3,833,895 | 9/1974 | Fecteau . |
| 3,867,844 | 2/1975 | Shimizu . |
| 3,987,408 | 10/1976 | Sassover et al. . |
| 4,021,796 | 5/1977 | Fawcett, Jr. . |
| 4,023,138 | 5/1977 | Ballin . |
| 4,028,567 | 6/1977 | Malliot . |
| 4,062,056 | 12/1977 | Goodrich . |
| 4,083,424 | 4/1978 | von den Stemmen . |
| 4,107,543 | 8/1978 | Kaplan . |
| 4,141,010 | 2/1979 | Umpleby . |
| 4,143,368 | 3/1979 | Route . |
| 4,205,300 | 5/1980 | Ho et al. . |
| 4,232,354 | 11/1980 | Mueller . |
| 4,233,642 | 11/1980 | Ellsberg . |
| 4,327,444 | 4/1982 | Court . |
| 4,383,242 | 5/1983 | Sassover . |
| 4,584,569 | 4/1986 | Lopez . |
| B1 3,548,373 | 1/1987 | Rivera et al. . |

OTHER PUBLICATIONS

"1976 Cadillac Seville Wiring Diagram".
"THE UNGO BOX" Instruction Manual, Techne Electronics, Ltd., Jan. 1976.
"AUTOLOCK-7" Instruction Manual, Comp-U-Lock Corp., 1978/1979.

*Primary Examiner*—Donnie L. Crosland

[57] ABSTRACT

An automobile burglar alarm and theft prevention device for use in an automotive vehicle is adapted to prevent operation of the vehicle when the device is placed in an operative mode. The device comprises an alarm circuit which includes the battery of the vehicle, the alarm and vibration detectors which are adapted to close said alarm circuit upon sensing vibrations caused by automobile tampering. The device also includes an automobile operating circuit comprising the battery, the electrically powered automotive starting elements, a switch for selectively connecting either the alarm circuit or the automobile operating circuit to the battery, and a relay for (1) switching the switch to connect the alarm circuit to the battery while disconnecting the automobile operating circuit and the battery, and (2) switching the switch to connect the automobile operating circuit to the battery while disconnecting the alarm circuit and the battery, thereby disabling the electrically powered automotive starting elements at all times that the alarm circuit is connected to the battery and preventing activation of the car. In alternate embodiments, the automotive accessories are (1) operative, and (2) inoperative, regardless of whether the alarm circuit or the automobile operating circuit is connected to the battery.

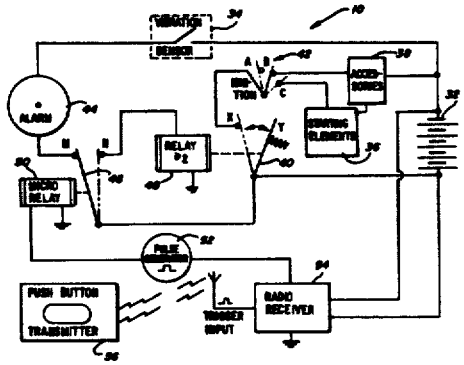

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is cancelled.

Claims 2, 4, 6, 7 and 8 are determined to be patentable as amended.

Claims 3 and 5, dependent on an amended claim, are determined to be patentable.

2. A device as in claim [1] *8* wherein the switch means comprises an alarm switch for connecting and disconnecting the alarm circuit to the battery, and a start switch for connecting and disconnecting the automobile operating circuit to the battery, whereby activating and positioning the ignition switch in the first position connects the automobile operating circuit to the battery.

4. A device as in claim [1] *8* wherein the switch means comprises an alarm-start switch for either connecting the alarm circuit or the automobile operating circuit to the battery.

6. A device as in claim [1] *8* wherein the automobile operating circuit further includes electrically powered automotive accessories, the accessories being disabled at all times that the alarm circuit is connected to the battery.

7. [A device as in claim 1 wherein the automobile operating circuit further includes] *An automobile burglar alarm and theft prevention device for use in an automotive vehicle, the vehicle including a battery, electrically powered automotive starting elements and electrically powered automotive accessories, a selectively positionable ignition switch, the ignition switch adapted to draw power from the battery to start the automobile and operate the automotive accessories when in a first position and the ignition switch adapted to draw power from the battery to operate the automotive accessories without starting the automobile when in a second position; the automobile burglar alarm and theft prevention device comprising, in combination:*

*an alarm circuit;*

*an automobile operating circuit;*

*switch means for selectively connecting either the alarm circuit or the automobile operating circuit to the bat-*

*tery of the automobile; the alarm circuit including the battery, alarm means, and vibration detection means for sensing automobile tampering and operative upon sensing vibrations to close the alarm circuit when the alarm circuit is connected to the battery;*

*the automobile operating circuit including the battery and the electrically powered automotive starting elements and* electrically powered automotive accessories, the accessories being operable whenever either the alarm circuit or the automobile operating circuit is connected to the battery; *and*

*means (a) for switching the switch means to connect the alarm circuit to the battery while disconnecting the automobile operating circuit and the battery and (b) for switching the switch means to connect the automobile operating circuit to the battery while disconnecting the alarm circuit and the battery, thereby disabling the electrically powered automotive starting elements at all times that the alarm circuit is connected to the battery.*

8. [A device as in claim 1] *An automobile burglar alarm and theft prevention device for use in an automotive vehicle, the vehicle including a battery, electrically powered automotive starting elements and electrically powered automotive accessories, a selectively positionable ignition switch, the ignition switch adapted to draw power from the battery to start the automobile and operate the automotive accessories when in a first position and the ignition switch adapted to draw power from the battery to operate the automotive accessories without starting the automobile when in a second position; the automobile burglar alarm and theft prevention device comprising, in combination:*

*an alarm circuit;*

*an automobile operating circuit;*

*switch means for selectively connecting either the alarm circuit or the automobile operating circuit to the battery of the automobile; the alarm circuit including the battery, alarm means, and vibration detection means for sensing automobile tampering and operative upon sensing vibrations to close the alarm circuit when the alarm circuit is connected to the battery;*

*the automobile operating circuit including the battery and the electrically powered automotive starting elements;*

*means (a) for switching the switch means to connect the alarm circuit to the battery while disconnecting the automobile operating circuit and the battery and (b) for switching the switch means to connect the automobile operating circuit to the battery while disconnecting the alarm circuit and the battery, thereby disabling the electrically powered automotive starting elements at all times that the alarm circuit is connected to the battery; and* further including high frequency transmitting means for remotely activating the means for switching the switch means.

* * * * *